Aug. 10, 1926.

J. Q. LEAVITT 1,595,954

APPARATUS FOR PEELING ARTICLES

Filed June 11, 1924   2 Sheets-Sheet 1

WITNESSES
H. J. Walker
S. W. Foster

INVENTOR
James Q. Leavitt
BY
ATTORNEYS

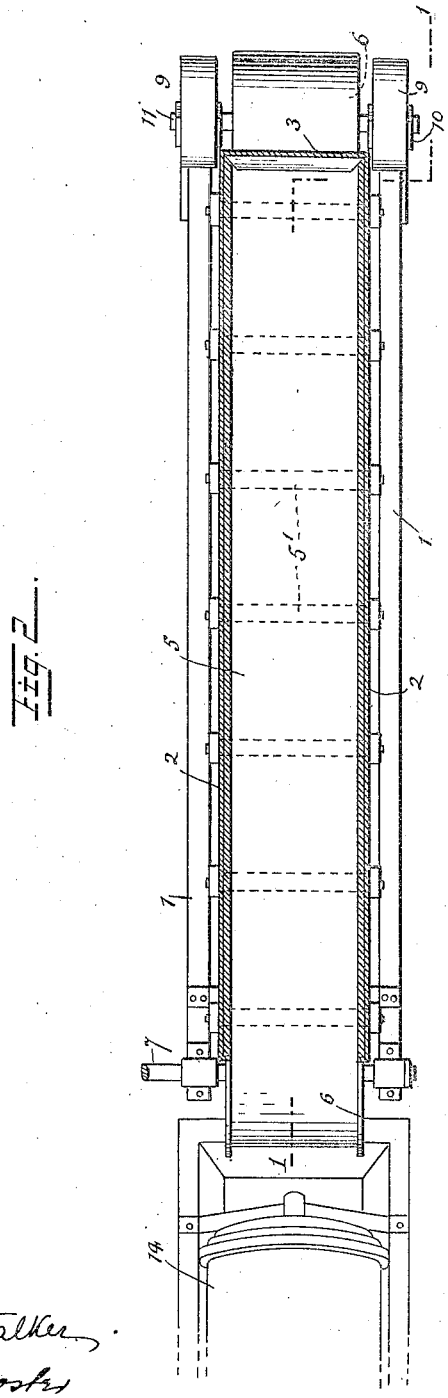

Patented Aug. 10, 1926.                                    1,595,954

UNITED STATES PATENT OFFICE.

JAMES QUINCY LEAVITT, OF OGDEN, UTAH.

APPARATUS FOR PEELING ARTICLES.

Application filed June 11, 1924. Serial No. 719,414.

This invention relates in general to improvements in the art of peeling skin covered articles, and relates more specifically to an improved method of and apparatus for automatically peeling edible articles such as vegetables and fruits.

An object of the invention is to provide a simple and efficient method of peeling articles such as vegetables and fruits. Another object of the invention is to provide simple, efficient, compact and automatically functioning appartus for commercially exploiting the improved method. Still another object of the invention is to provide a method of and apparatus for effectively removing the skin from vegetables and fruit by the direct application of heat, and for subsequently destroying the removed skin without damaging the bodies of the articles.

With these and other objects in view, the invention consists in certain novel features of construction and combinations and arrangements of parts which will be more fully hereinafter described and pointed out in the claims.

In the accompanying drawings—

Figure 2 is a view in section on the line 2—2 of Figure 1.

Figure 1:
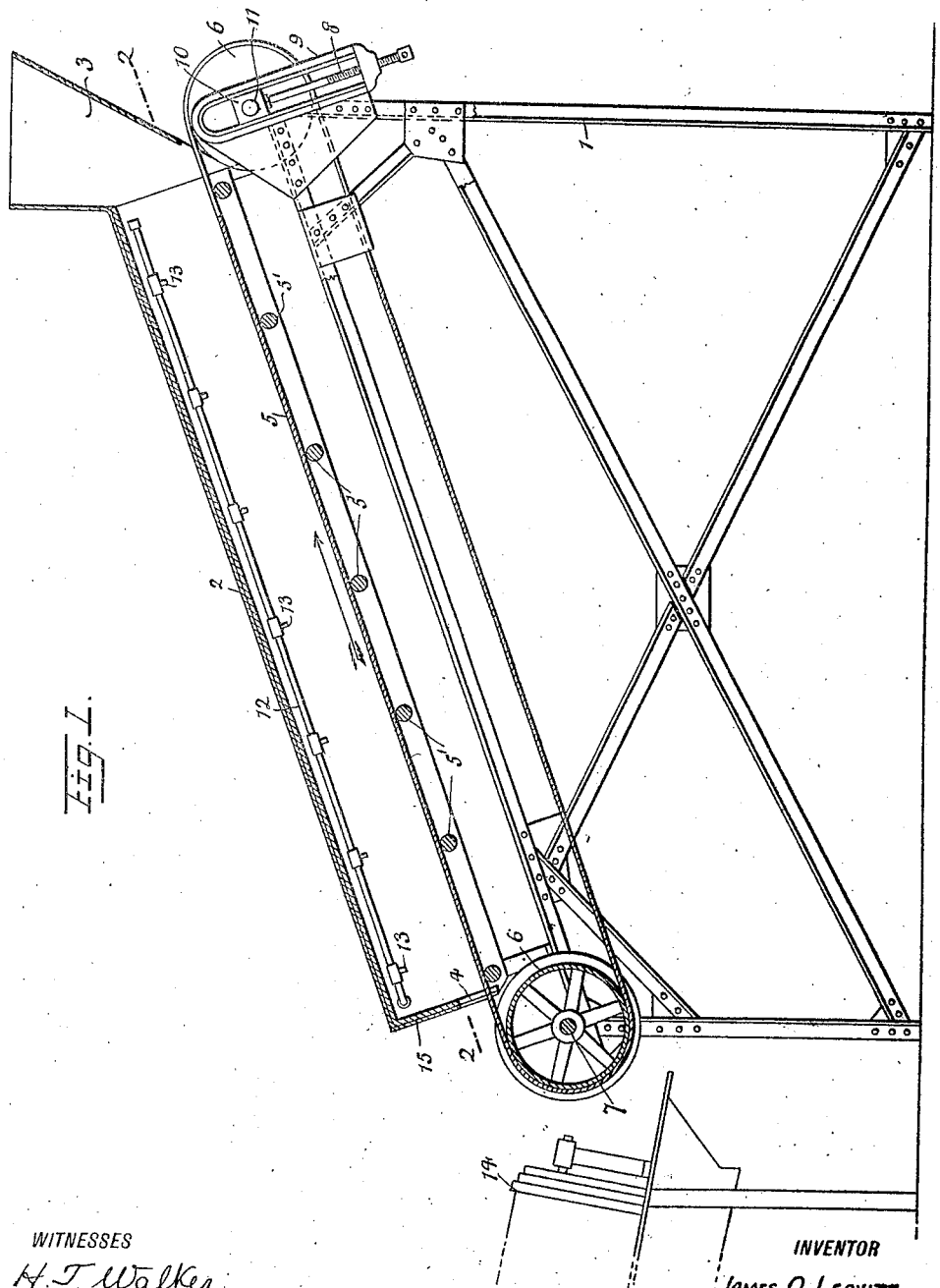
Figure 1 is a view in longitudinal section illustrating one embodiment of my invention.

1 represents a frame on which an elongated retort 2 is mounted. This retort 2 has an inlet hopper 3 at one end and a discharge opening 4 at its other end. 5 represents an endless belt or draper which is mounted on suitable drums 6, one of which may constitute a driver, and the retort with its arrangement of drums and apron may constitute a single unit pivoted on the shaft 7 of one of the drums 6 and adjustably mounted at its other end on set screws 8 located in suitable frames 9 and engaging bearings 10 of the shaft 11 on which the other drum 6 is mounted. By reason of this adjustable mounting of one end of the retort and its related parts, the incline or angle of the retort can be varied to control the speed or rapidity of feed of the fruit or vegetables through the retort. The upper run of the belt 5 is preferably supported on rollers 5′ and said belt turns in the direction of the arrow illustrated in Figure 1.

It is the purpose of my invention to subject the fruit and vegetables, which are caused to pass downwardly through the retort 2, to direct heat or flame applied to the surface thereof so as to burn or otherwise remove the skin on the fruit or vegetables. To insure a uniform action against all surfaces of the fruit or vegetables, I cause the belt 5 to move in a direction opposite to the direction of movement of the fruit or vegetables so that by reason of this action of belt the fruit or vegetables will be caused to revolve or turn as they pass downwardly through the retort.

I have illustrated in the upper portion of the retort 2 a pipe 12 which may have any suitable number of burners 13, and this pipe 12 may constitute a gas supply pipe so that when the burners are ignited the flame therefrom will contact with the fruit or vegetables; or as a substitute I may employ any other heating medium which will give the necessary burning action to the skin of the fruit or vegetables as, for example, steam or other medium, which will answer the purpose.

The invention, therefore, comprehends broadly the idea of subjecting fruit, vegetables and the like to heat directed against their outer surfaces or skins while said fruit or vegetables are turned or revolved so that the skin is burned off during the passage through the apparatus.

The lower end of the retort 2 preferably discharges into a suitable washer 14 so that the operation of peeling and washing the fruit or vegetables can be a continuous one.

When I employ burners within the retort I preferably line the retort with asbestos or other suitable lining 15.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. An apparatus of the character described, comprising an inclined retort through which fruit or vegetables are adapted to travel, a belt constituting the bottom of said retort and movable in a direction opposite to the direction of feed of the fruit or vegetables through the retort, and means in the retort for subjecting the surface of said fruit or vegetables to a temperature sufficient to burn the peel therefrom.

2. An apparatus of the character described, comprising an inclined retort through which fruit or vegetables are adapted to travel, a belt constituting the bottom of said retort and movable in a direction opposite to the direction of feed of the fruit or vegetables through the retort, means in the retort for subjecting the surface of said fruit or vegetables to a temperature sufficient to burn the peel therefrom, and means for adjusting the angle of said retort.

3. An apparatus of the character described, comprising a support, a relatively long retort hingedly mounted at one end on the support, means at the other end of the retort for adjusting the angular disposition of the same, an endless belt constituting the bottom of said retort and having its upper run moving upwardly through the retort, said retort having a hopper at its upper end and an outlet at its lower end, and burners located in the retort whereby fruit or vegetables passing through the retort are subjected to the direct action of the flames of the burners.

JAMES QUINCY LEAVITT.